(12) United States Patent
Said et al.

(10) Patent No.: US 8,059,762 B2
(45) Date of Patent: *Nov. 15, 2011

(54) SYSTEM AND METHOD FOR ENHANCED SYMBOL GENERATION

(75) Inventors: Ahmed Said, Saratoga, CA (US);
Varadanarayanan Mugundhan, Santa Clara, CA (US); Elias Nemer, San Jose, CA (US); Gregory R. Goslin, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/603,192

(22) Filed: Oct. 21, 2009

(65) Prior Publication Data

US 2010/0104050 A1 Apr. 29, 2010

Related U.S. Application Data

(63) Continuation of application No. 11/479,570, filed on Jun. 30, 2006, now Pat. No. 7,627,064.

(51) Int. Cl.
*H04L 27/06* (2006.01)
(52) U.S. Cl. ........................................................ 375/340
(58) Field of Classification Search .................. 375/222, 375/262, 265, 340, 341, 350
See application file for complete search history.

(56) References Cited

U.S. PATENT DOCUMENTS

| | | | |
|---|---|---|---|
| 5,721,746 A * | 2/1998 | Hladik et al. | 714/792 |
| 5,825,832 A | 10/1998 | Benedetto | |
| 6,009,552 A | 12/1999 | Ariel et al. | |
| 6,038,696 A | 3/2000 | Chouly et al. | |
| 6,634,007 B1 | 10/2003 | Koetter et al. | |
| 7,324,584 B1 * | 1/2008 | Vigneron et al. | 375/150 |
| 7,627,064 B2 * | 12/2009 | Said et al. | 375/350 |
| 2003/0206073 A1 * | 11/2003 | Kravtsov | 332/103 |
| 2005/0154967 A1 | 7/2005 | Heo et al. | |
| 2006/0291553 A1 | 12/2006 | Nemer | |
| 2007/0230554 A1 | 10/2007 | Said et al. | |
| 2009/0262864 A1 * | 10/2009 | Liu et al. | 375/322 |

* cited by examiner

*Primary Examiner* — Don N Vo
(74) *Attorney, Agent, or Firm* — Buckley, Maschoff & Talwalkar LLC

(57) ABSTRACT

According to some embodiments, an input symbol may be received, and a hard symbol may be generated from the input symbol. A probability associated with the hard symbol may be calculated along with a probability associated with a previous hard symbol. An enhanced symbol may then be determined as a function of a comparison between the probability associated the hard symbol and the previous hard symbol.

7 Claims, 11 Drawing Sheets

Given : received symbol = '2.2'.

Thus :

Either transmitted symbol = 3, thus Y0 = 1

Or   transmitted symbol = 1 or thus Y0 = 0

SYSTEM AND METHOD FOR ENHANCED SYMBOL GENERATION

CROSS REFERENCE TO RELATED APPLICATION

The present application is a Continuation of U.S. patent application Ser. No. 11/479,570 (issued as U.S. Pat. No. 7,627,064), which was filed Jun. 30, 2006 and entitled "SYSTEM AND METHOD FOR ENHANCED SYMBOL GENERATION". The contents of U.S. patent application Ser. No. 11/479,570 are hereby incorporated by reference in its entirety.

BACKGROUND

A Linear Adaptive Filter (LAF) 100 is shown in FIG. 1. The LAF 100 has a slicer 110. Generally, such a slicer 110 may be defined as a device that truncates input data and outputs data as a value that is closest to a defined allowable value. The slicer 110 may, for example, provide an estimate (hard symbol 115) associated with a value of a received symbol 112.

Graphically, this operation may place decision boundaries between eight possible hard symbols, such as those illustrated in FIG. 2. These boundaries may be, for example, the mid points between consecutive hard symbols.

According to some embodiments, in the example, given the input symbol 112 (which shall be referred to as "y"), the hard symbol 115 ("Ŷ") is therefore:

If 4<=y<6 then Ŷ=5
If 2<=y<4, then Ŷ=3
etc.

Thus, as long as the input symbol 112 is received within a decision boundary corresponding to the input symbol 112 as it was originally transmitted, the hard symbols 115 are correct. However, due to such factors as noise, the received input symbols 112 may fall within a wrong boundary, causing the slicer 110 to generate the wrong hard symbol 115. For example a symbol '3' might be transmitted, but an input symbol '4.25' may be received. Thus, the slicer 110 outputs the incorrect hard symbol 115 value of '5'. The case of 20 dB SNR is shown in FIG. 2 and illustrates the instances of wrong decisions.

Turning back to FIG. 1, in the LAF 100, soft symbols 155 ỹ [k] (the input to slicer 110) are generated from input symbols 112 that have been filtered through a feed forward filter 140 and compared to hard symbols 115 that have been filtered through a feed back filter 120 via a comparator 130. Soft output 115 can be used to operate, for instance, a Viterbi Decoder (not illustrated).

Generally, filters 120 and 140 can compensate for various transitory changes/error conditions in input symbols 112. An error e(k) 142, representing the difference in value between soft symbol ỹ 155 and hard symbol 115, can be used to update coefficients of filter 120 taps and filter 140 taps using a coupled least mean squared (LMS) adapter 145.

Input symbols 112 may have three components: an original (wanted) transmitted signal ($\chi$), a reflections component ($\delta\chi$), and an Additive Gaussian Noise (AWGN). Assuming no AWGN and other imperfections in LAF 100, coefficients of taps of FBF 120 and FFF 140 will typically converge so that an error e(n), (determined by an error determiner), will be zero, and the coefficients may converge to a fixed set.

However, in real-world scenarios, even after filters 120, 140 have converged, the slicer error 142 will typically be non-zero due to the presence of random noise. As the random noise level gets higher, as in case of low SNR (signal to noise ratio) input symbols 112, the hard symbols 115 ỹ [k] applied to filters 120 and 140 will be wrong. This will, in turn, cause a greater slicer error 144 e(k) value, which may cause a faulty programming of the filter's 120 coefficients and filter 140 to change in the wrong direction when updated by the LMS 145, which in turn creates more errors and ultimately the filter 100 may become becomes unstable.

DETAILED DESCRIPTION

Figure 1:
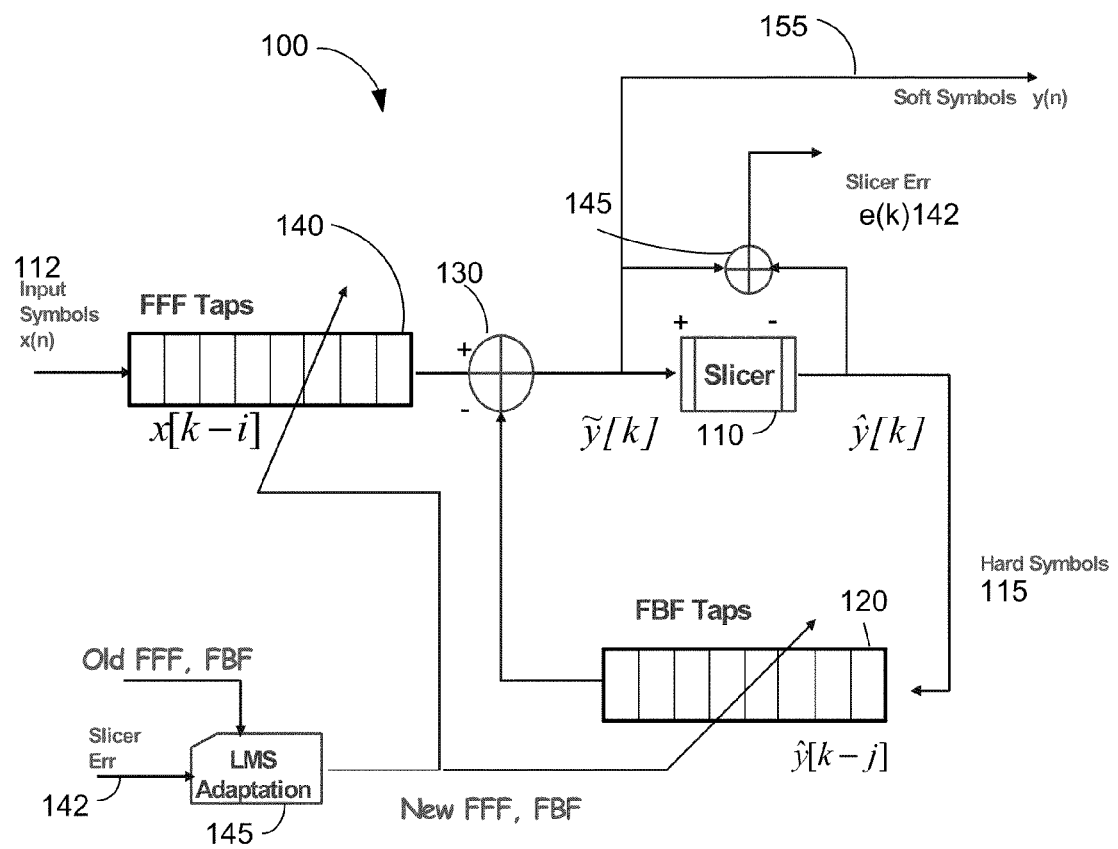
FIG. 1 is a figure of a linear adapter filter.
Figure 2:
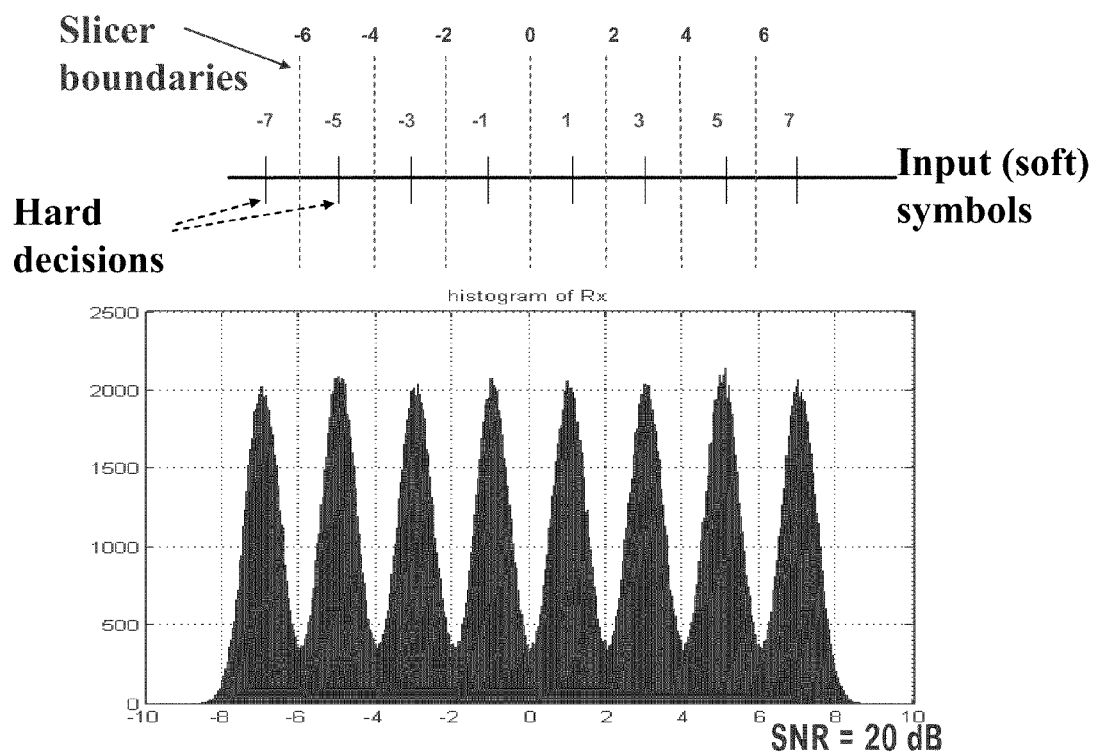
FIG. 2 a figure of illustrating boundary conditions for use with noisy input symbols according to some embodiments.
Figure 3:
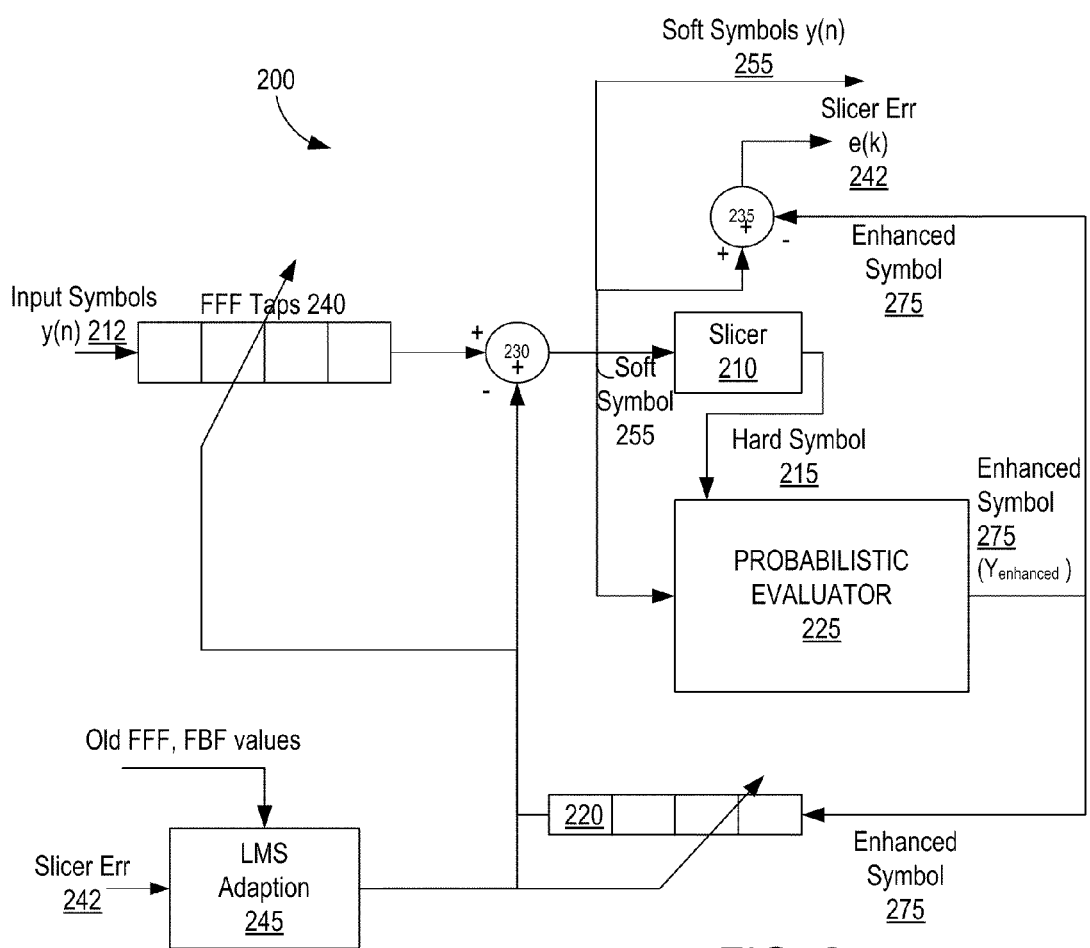
FIG. 3 is a linear adapter filter with a probabilistic evaluator according to some embodiments.

Referring first to FIG. 3, a block diagram of an apparatus 200 is illustrated. In some embodiments, the apparatus 200 may be a linear adapter filter. Generally, in some embodiments, apparatus 200 uses a parity bit, such as a Trellis-Coded Modulation (TCM), to reduce errors in feed-back. A TCM parity bit may be embedded in each input symbol 212 to the slicer 210. Generally, by comparing the probability of a parity of a present input symbol 212 being read correctly of a present hard symbol 215 versus the likelihood of parity bits and/or non-parity bits of previous input symbols 212 being read correctly within a previous hard symbol 215, a probabilistic evaluator 225 of the apparatus 200 generates a better estimate of the correct symbol output, therefore reducing the probability of the wrong information being used to program filters 220 and 240. In other words, in some embodiments, the apparatus 200 may exploit an encoding of previous input symbols 212 in order to predict whether a currently-received input symbol 212 is likely to be correctly decoded or not, and if not, to take appropriate action, as will be detailed below.

The output of the probabilistic evaluator 225 is an enhanced symbol $\hat{Y}_{enhanced}$ 275, which is conveyed both to an error differentiator 235 and an input symbol differentiator 230. Within error differentiator 235, a slicer error $e_k$ 242 is generated by comparing a soft symbol ỹ 255 with the enhanced symbol 275 in the error determiner 235. A coupled filter programmer 245, such as a LMS adapter, employs slicer error 242 $e_k$ and may employ old values of the taps of filters 220, 240 to update both of these taps to generate new tap values. Soft symbol ỹ 255 is therefore a function of at least an enhanced symbol 275. In some embodiments, the soft symbol ỹ 255 is a function of previous enhanced symbols 275.

Generally, the apparatus 200 uses the relation between previous symbols 212 and the current symbol 212 to get an estimated value of the current symbol 112 $\hat{Y}_{predicted}$. As will be discussed below, in probabilistic evaluator 225, a mismatch between $\hat{Y}_{predicted}$ predicted symbol value (based on the last two hard symbols $\hat{Y}$ 215) and the hard symbol $\hat{Y}$ 215 for the present input symbol 212, is an indication of a potential decoding error (due to such factors as excess noise). The hard symbol 215 may then be corrected or re-evaluated accordingly. The probabilistic evaluator 225 may be used as part of a decision feedback equalizer, such as with FFF Tap 220, operating in low SNR conditions.

In some embodiments, the apparatus 200 may predict the maximum probability that a value of a presently-received symbol 212 is decoded accurately as the enhanced symbol 275 based upon characteristics of the present hard symbol 215. For ease of explanation, this probability is referred to as P($\hat{Y}$), and is a probability that the originally determined hard code symbol 215 is correct. The apparatus 200 then makes a predicted value of at least part of the hard symbol 215, based on probabilities associated with past two iterations of previous symbols 212. For ease of explanation, this is referred to as P($\hat{Y}$)$_{predicted}$. Generally, the probabilistic determiner 225 first compares ($\hat{Y}$) with ($\hat{Y}$)$_{predicted}$ to see if they are equal. If they are, $\hat{Y}$ is output as enhanced symbol 275. However, if they are not, probabilistic determiner 225 compares the P($\hat{Y}$) to the P($\hat{Y}_{predicted}$) to determine which value has the higher probability of being correct, and uses the higher probability value as part of enhanced symbol 275.

Generally, many digital communication systems utilize convolution encoding as an outer forward error correction (FEC) layer. To help clearly explain, ATSC will be used as an example. However, other encoding can be used with apparatus 200.

The apparatus 200 exploits the fact that input symbols 212 may be convolutionally encoded into specific values. In ATSC, these specific values are those in the set [−7, −5, −3, −1, 3, 5, 7]. Each set is represented by a 3-bit number (y0, y1, y2). The following Table 1 represents this. For example, the symbol of −1 may be expressed as y0(−1), y1(1), y2(0).

TABLE 1

Mapping of the 3 Bits to the symbol value

| Y2 | Y1 | Y0 | Symbol |
|---|---|---|---|
| 0 | 0 | 0 | −7 |
| 0 | 0 | 1 | −5 |
| 0 | 1 | 0 | −3 |
| 0 | 1 | 1 | −1 |
| 1 | 0 | 0 | 1 |
| 1 | 0 | 1 | 3 |
| 1 | 1 | 0 | 5 |
| 1 | 1 | 1 | 7 |

Figure 4:
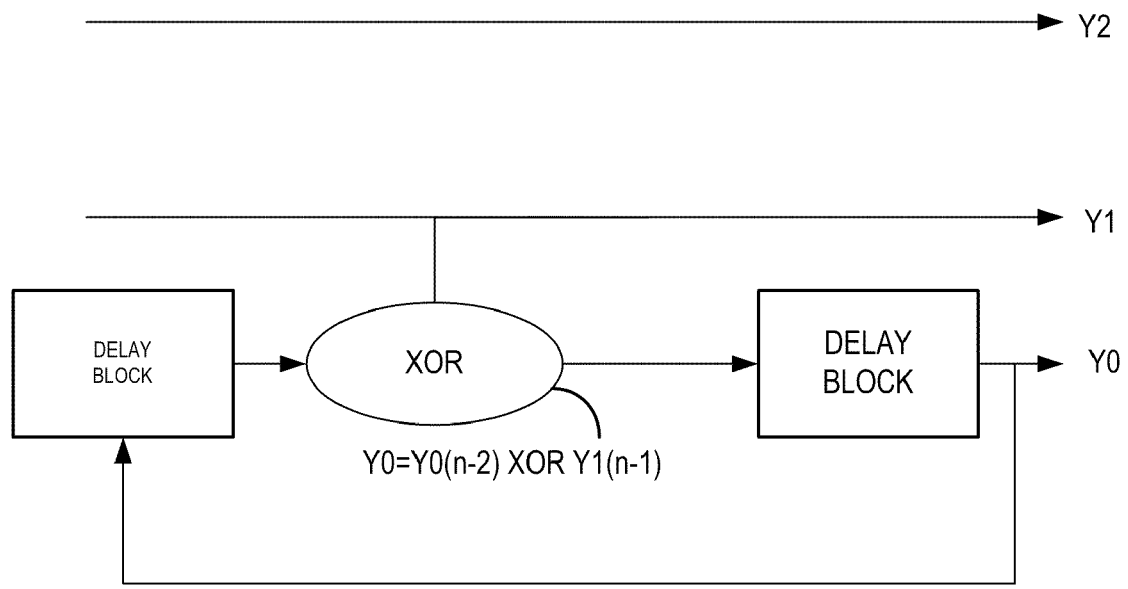
FIG. 4 is an illustration of a difference equation for use with the probabilistic evaluator according to some embodiments.

Furthermore, for a given input symbol 212, bit y0 is generated from previous values of y0 and y1. In particular, as is illustrated in FIG. 4, a current value of y(0) of an input symbol 212 is are a function of the y0(n) value of an input symbol 212 of 2 symbols ago ("n−2"), exclusively ORed (XORed) with the y1 value of an input symbol 212 of 1 symbol ago ("n−1"). This can be expressed as:

$$Y0 = Y0(n-2) \, XOR \, Y1(n-1) \quad \text{Equation 1}$$

Turning back to FIG. 3, within probabilistic evaluator 225, the value $\hat{Y}0$ of hard symbol 215 is compared to the predicted value of $\hat{Y}0$ derived from the previous two hard symbols 215 (specifically, the estimated values for $\hat{Y}0$ and $\hat{Y}1$ in these symbol iterations, as expressed above in Equation 1.). A mismatch between the predicted and the received values of the present symbol $\hat{Y}0$ is an indication of a decoding error (perhaps due to excess noise). A more likely accurate symbol value may then be obtained, as will be described in more detail below.

As mentioned above, slicer's 210 hard output $\hat{Y}$ may be the hard symbol 215 {−7, −5, −3, −1, 1, 3, 5, or 7}, which is closest to the received symbol 212 ("Y"). With exception of the two cases {Y<=−7, and Y>=7}, the probability of making correct decision is given by:

$$P(\hat{Y} == \text{correct}) = \frac{1}{\sigma\sqrt{2\pi}} e^{-\frac{(Y-\hat{Y})^2}{2\sigma^2}}, \quad \text{Equation 2}$$

and $$P(\hat{Y} == \text{incorrect}) = \frac{1}{\sigma\sqrt{2\pi}} e^{-\frac{(Y-\hat{Y}\pm 2)^2}{2\sigma^2}}. \quad \text{Equation 3}$$

wherein $\hat{Y}$ is the hard symbol 215 that is generated by slicer 210.

It should be noticed the one-to-one relation between making an error in $\hat{Y}$ and making an error in LSB of $\hat{Y}$, that is, $\hat{Y}(0)$ and vice versa. In other words, because the $\hat{Y}(0)$ value determines if the $\hat{Y}$ symbol should be one of two neighboring hard symbol 215, the percentage chance that a determined hard symbol 215 is the correct is the same percentage chance that its $\hat{Y}0$ value is correct. As will be detailed below, probabilistic evaluator 215 may give a more accurate estimation of Y0 received as input symbol 212, and therefore probabilistic evaluator 215 may give a better estimation of input symbol 212 as enhanced symbol 275.

On the other hand, one can notice that this relation is not true between $\hat{Y}$ and the second LSB (Y1) (that there is a 1:1 correspondence in probabilities of the second bit of input symbol 212 being accurately decoded and the hard symbol 215 itself being accurately) only if:

$$\{-5 <= Y <= -3, -1 <= Y <= 1, \text{ or } 3 <= Y <= 1\} \quad \text{Equation 4}$$

(that is, only if input symbol 212 falls within one of these ranges)

Otherwise the probability of making an error in $y_1$ is almost nil. In other words, with probability ⅝ there will be no errors in estimating $\hat{Y}1$ as $\hat{Y}1$ within hard symbol 215.

Within probabilistic evaluator 225, the estimated value of y0, the hard symbol 215 $\hat{Y}0$, is derived from the input symbol 212. For instance, if the received input symbol 212 is 2.2, then it is likely that the transmitted symbol was 3 and thus the hard symbol 215 value of $\hat{Y}0$ is 1.

There are, however, two probabilistic scenarios in the present example.

The first probabilistic scenario in the present example, is that received symbol 212 was originally transmitted as a 3, and therefore the received input symbol 212 correctly falls within the boundaries corresponding to 3 defined by slicer 210, thus $\hat{Y}0 = 1$, and $\hat{Y}1$ correctly equals 1. The probability of this occurrence (assuming Gaussian noise) is given by:

$$Prob[Y_0 = 1] = rob\begin{bmatrix} TxSym = 3 \, | \\ RxSym = 2.2 \end{bmatrix} \propto e^{\frac{-delta^2}{2\sigma^2_{SNR}}} \quad \text{Equation 4}$$

Figure 5:
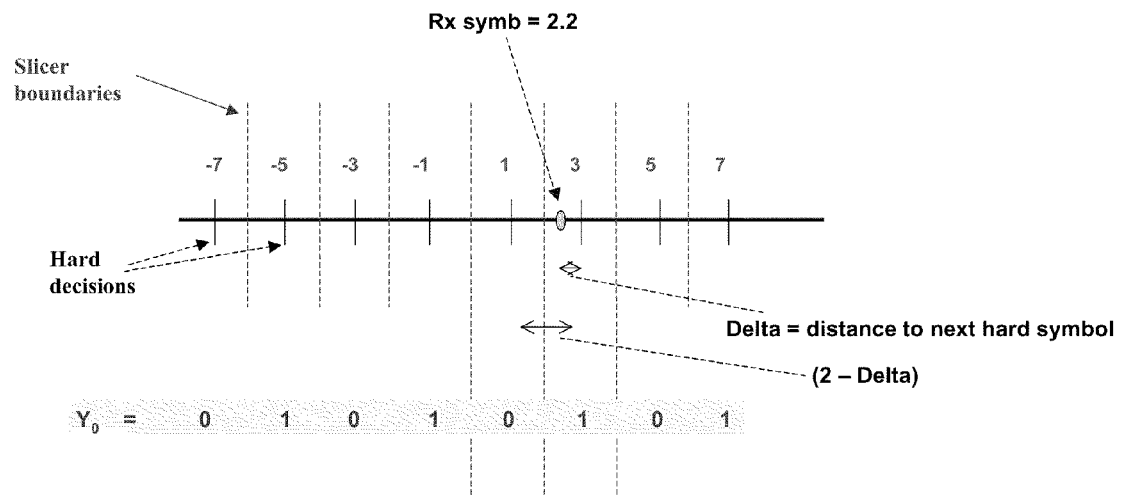
FIG. 5 is a graph illustrating determining a value of Ŷ0 based on the received symbol.

Here, 'delta' is the "distance" between the soft symbol 255 and the nearest hard symbol 215 generated by the slicer 210, as will be illustrated in reference to FIG. 5. For ease of explanation, the logarithmic value of the probability is used, in order to remove the exponential terms.

The case discussed above is illustrated in FIG. 5: In FIG. 5, the RX symbol input symbol 212 is 2.2, and the delta is either '0.8' (to hard symbol break 3), or '2-delta' (to hard symbol break 1).

The second scenario, the transmitted symbol was originally a 1, and, due to such factors as AWGN, the received symbol 212 incorrectly falls within the boundaries corresponding to 3, thus incorrectly $\hat{Y}0=0$.

The probability of this occurrence (again, assuming Gaussian noise) is given by:

$$Prob[Y_0 = 0] = rob\begin{bmatrix} TxSym = 1 \mid \\ RxSym = 2.2 \end{bmatrix} \propto e^{\frac{-delta^2}{2\sigma_{SNR}^2}}. \quad \text{Equation 5}$$

Thus in general, given the distance (delta) between the soft symbol 145 and the hard symbol 215 (generated by the slicer 210), the probabilities of the 2 possible values for bit y0 as being decoded accurately in hard symbol $\hat{Y}0$ 215 can be calculated as shown in Table 2, below.

TABLE 2 probability computations of y0

| Range of input symbol 212 | Estimated Value of y0 | −ln(Prob [y0 = 0]) | −ln(Prob [y0 = 1]) |
|---|---|---|---|
| Y <= −7 | 0 | 0 | Infinite |
| −7 < Y <= −6 | 0 | $\Delta^2$ | $(2 - |\Delta^2|)$ |
| −6 < Y < −4 | 1 | $(2 - |\Delta^2|)$ | $\Delta^2$ |
| −4 <= Y < −2 | 0 | $\Delta^2$ | $(2 - |\Delta^2|)$ |
| −2 <= Y < 0 | 1 | $(2 - |\Delta^2|)$ | $\Delta^2$ |
| 0 <= Y < 2 | 0 | $\Delta^2$ | $(2 - |\Delta^2|)$ |
| 2 <= Y < 4 | 1 | $(2 - |\Delta^2|)$ | $\Delta^2$ |
| 4 <= Y < 6 | 0 | $\Delta^2$ | $(2 - |\Delta^2|)$ |
| 6 <= Y < 7 | 1 | $(2 - |\Delta^2|)$ | $\Delta^2$ |
| Y >= 7 | 1 | Infinite | 0 |

Generally, the probability of accuracy of decoding input symbol 212 value y0 correctly is calculated and stored by probabilistic evaluator 215 for further comparison with previous values of $\hat{Y}(0)$ and $\hat{Y}(1)$ values of hard symbols 215, as will be described below. In some embodiments, this performed by using soft symbol 255.

In some embodiments, probabilistic evaluator 215 also calculates the probability that y(1) value of the present input symbol 212 was decoded correctly. This probability will be used for later determinations as to whether a current hard symbol 215 being correctly decoded, as will be detailed below.

In, the device 200, the probability for the value of $P(\hat{Y})1$ of the hard symbol 215 as an accurate is also calculated. The probability for the 2 possible values of y1 being decoded accurately is derived as a function of the received input symbol 212. For instance, if the received input symbol 212 is '−0.2', then it is likely that the transmitted symbol to which input symbol 212 correlates was '−1,' and the value of $\hat{Y}1$ within hard symbol 215 is also correctly a '1'.

There are however two probabilistic scenarios

In a first scenario, the probability of the received input symbol 212 being correct (assuming Gaussian noise) is given by:

$$Prob[Y_1 = 1] = rob\begin{bmatrix} TxSym = -1 \mid \\ RxSym = -0.2 \end{bmatrix} \propto e^{\frac{-delta^2}{2\sigma_{SNR}^2}} \quad \text{Equation 6}$$

Here, 'delta' is the distance between the received symbol and the hard break, such as '−1'. For convenience, the logarithmic value of the probability is used, in order to remove the exponential terms.

Figure 6:
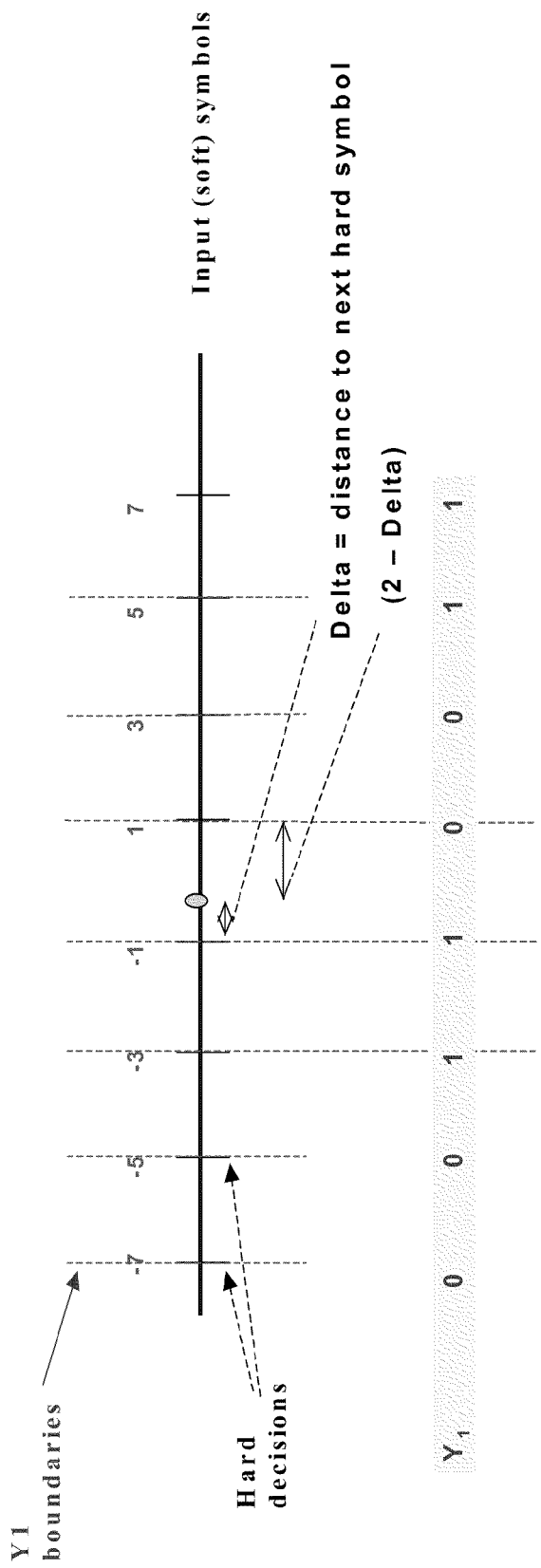
FIG. 6 illustrates boundaries and decisions according to some embodiments.

The case discussed above is illustrated in FIG. 6. In FIG. 5, the RX symbol input symbol 212 is −0.2, and the delta is either '0.8' (to hard symbol break 3), or '2-delta' (to hard symbol break 1).

In a second scenario, the probability of the received input symbol being incorrect (assuming Gaussian noise) is given by:

$$Prob[Y_1 = 0] = rob\begin{bmatrix} TxSym = 1 \mid \\ RxSym = -0.2 \end{bmatrix} \propto e^{\frac{-|2-delta|^2}{2\sigma_{SNR}^2}}. \quad \text{Equation 7}$$

Thus in general, the probabilities of the 2 possible values for bit y1 can be calculated as shown in Table 3 below.

TABLE 3 probability computations of y1

| Range of input symbol | Δ | −ln(Prob [y1 = 0]) | −ln(Prob [y1 = 1]) |
|---|---|---|---|
| Y < −5 | 0 | 0 | Infinite |
| −5 <= Y < −3 | Δ = Y + 5 | $\Delta^2$ | $(2 - |\Delta|)^2$ |
| −3 <= Y < −1 | 0 | infinite | 0 |
| −1 <= Y < 1 | Δ = Y + 1 | $(2 - |\Delta|)^2$ | $\Delta_1^2$ |
| 1 <= Y < 3 | 0 | 0 | infinite |
| 3 <= Y < 5 | Δ = Y − 3 | $\Delta^2$ | $(2 - |\Delta|)^2$ |
| Y >= 5 | 0 | infinite | 0 |

In the following explanation, (n) refers to a present $\hat{Y}$ symbol 212, (n−1) refers to the previous $\hat{Y}$ symbol 212, (n−2) refers to the second previous $\hat{Y}$ symbol 212, and so on.

As mentioned above $\hat{y}0(n)=y1(n-1)\oplus y0(n-2)$, in other words, the transmitted input symbol 212 is a function of previous transmitted input symbols 212. The value $\hat{Y}0$ predicted can therefore be calculated in probabilistic evaluator 225, as will be discussed below. Therefore, $\hat{y}0(n)$ can also be predicted as $\hat{Y}0_{predicted}$ as a function of the value of maximum probability among the two possibilities.

In the first case, the probability that a predicted $\hat{y}0(n)$ value is correct can be calculated as follows Prob($\hat{y}0(n)$==1)=max{[Prob($y1(n-1)$==1]*Prob(($y0$ (n−2)==0],

[Prob($y1(n-1)$==0]*[Prob(($y0(n-2)$==1]}.

In other words, in some embodiments of the device 200, the probability of a predicted $\hat{y}0(n)$ value being correct, based upon previous hard symbol 212 $\hat{Y}(0)$ and $\hat{Y}(1)$ values, is performed by first calculating the probability $\hat{Y}1$ of (n−1) being correct, times the probability of $\hat{Y}(0)$ of (n−2) being incorrect. This calculation is compared to the probability that $\hat{Y}((n-1)$ value is incorrect, times the probability that $\hat{Y}(0)(n-2)$ is correct. The larger of these two probabilities is the odds that the $\hat{Y}(0)_{predicted}$ value was correctly predicted based off of previous $\hat{Y}(0)$ and $\hat{Y}(1)$ values.

As a collolary, in some embodiments of the device 200, the odds that the $\hat{Y}(0)_{predicted}$ value is incorrect may be calculated as follows:

Prob($\hat{y}0(n)$=0)=max{[Prob($y1(n-1)$==0]*Prob([$y0(n-2)$==0], |

[Prob($y1(n-1)$==1]*Prob($y0(n-2)$==1]},

But, in ⅝ of the cases, as discussed above, the probability that (y1(n−1)==correct) is 1, as there is no error in estimating y1(n−1) as $\hat{Y}1(n-1)$. Then, in these ⅝$^{th}$ of cases (i.e. over 50% of the time), the probability that ($\hat{y}0(n)$) is correct will be equal to the probability that (y0(n−2) has been decoded correctly as $\hat{Y}(0)(n-2)$.

In some embodiments, the probabilistic evaluator 225 compares the probability that $\hat{Y}0(n-2)$ is correct base upon a predicted value, (i.e., that y0(n−2) has been decoded correctly) to create $P(\hat{Y}(0)(n-2)_{predicted}$ with the probability (y0(n)==correct) as calculated for current hard symbol 215, and select the value. Then, probabilistic evaluator 225 selects as the $\hat{Y}(0)_{enhanced}$ value for enhanced symbol 275 the y(0) value that has the higher probability of being accurate, either $\hat{Y}(0)$ or $\hat{Y}(0)_{predicted}$. Through use of this, the probabilistic evaluator may achieve better estimation for y0(n), and accordingly for $\hat{Y}$, on the average.

In general, $\hat{Y}0$ of hard symbol 215 and $\hat{Y}0_{predicted}$ will have the same value.

In some embodiments of the probabilistic calculator 215, calculating $$P(\hat{Y} == \text{correct}) = \frac{1}{\sigma\sqrt{2\pi}} e^{-\frac{(Y-\hat{Y})^2}{2\sigma^2}}, \text{ and} \quad \text{(Equation 2)}$$

$$P(\hat{Y} == \text{incorrect}) = \frac{1}{\sigma\sqrt{2\pi}} e^{-\frac{(Y-\hat{Y}\pm 2)^2}{2\sigma^2}} \quad \text{(Equation 3)}$$

, for y(0) can be simplified as follows:
"−ln(x)" is monotonically proportional to 1/x, and:

$$-\ln\left[P(\hat{Y} == \text{correct})\right] = -\ln\left(\frac{1}{\sigma\sqrt{2\pi}}\right) + \frac{(|Y-\hat{Y}|)^2}{2\sigma^2} \quad \text{Equation 6}$$
$$= \alpha + \beta \cdot \Delta^2$$

and $$-\ln\left[P(\hat{Y} == \text{incorrect})\right] = -\ln\left(\frac{1}{\sigma\sqrt{2\pi}}\right) + \frac{(2-|Y-\hat{Y}|)^2}{2\sigma^2} \quad \text{Equation 7}$$
$$= \alpha + \beta \cdot (2-|\Delta|)^2$$

Which can be re-written as:

$$-\ln[P(\hat{Y} == \text{correct})]/\beta = \lambda + \Delta^2, \text{ and}$$

$$-\ln[P(\hat{Y} == \text{incorrect})]/\beta = \lambda + (2-|\Delta|)^2$$

Where:

$$\alpha = \ln(\sigma \cdot \sqrt{2\pi})$$

$$\beta = \frac{1}{2\sigma^2}$$

$$\lambda = \frac{\alpha}{\beta} = 2\sigma^2 \cdot \ln(\sigma \cdot \sqrt{2\pi})$$

$$\Delta = Y - \hat{Y}$$

Therefore, except for the bias λ, $\Delta^2$ and $(2-|\Delta|)^2$ can be used as a proportional values for $-\ln[P(\hat{Y}==\text{correct})]$ and $-\ln[P(\hat{Y}==\text{incorrect})]$ respectively. In addition, in some embodiments of the probabilistic calculator 215, this representation may replace the probability multiplication operations with direct addition. The only change may be selecting minimum values instead of maximum ones.

In some embodiments of probabilistic evaluator 215, the bias value of λ can be pre-calculated for different values of SNR and stored in a look up table) is added to $\Delta_n^2$ before comparing with corresponding value for probability that ($\hat{y}0$ (n)==correct).

Figure 7:
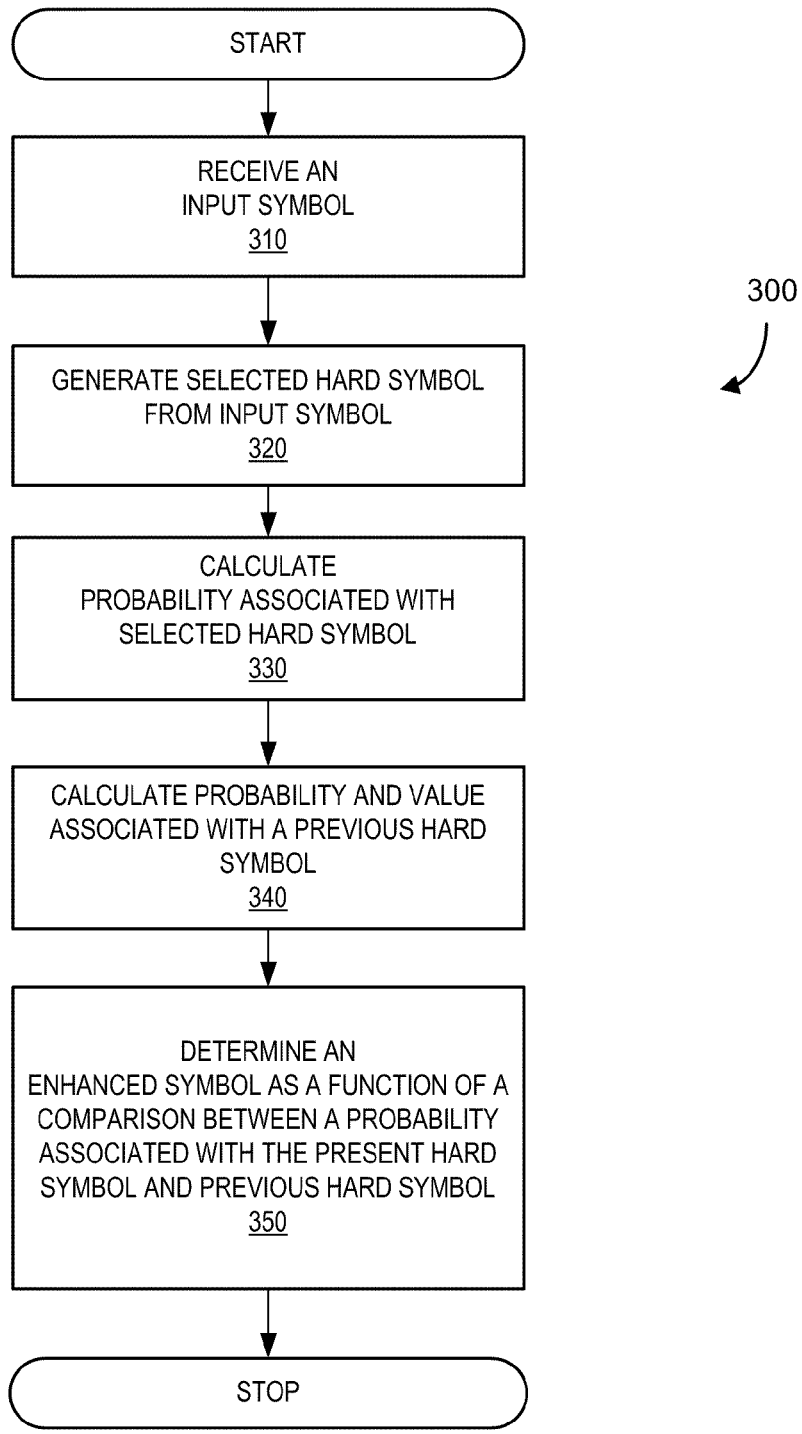
FIG. 7 is a method for generating an enhanced symbol according to some embodiments.

FIG. 7 illustrates a method 700 for determining an enhanced symbol. In some embodiments, the enhanced symbol may be enhanced symbol 275.

In 310, a input symbol is received. In some embodiments, this may be input symbol 212.

In 320, a selected hard symbol is generated from the input symbol. In some embodiments, this may be hard symbol 215 is generated by slicer 210.

In 330, a probability is calculated associated with the hard symbol. In some embodiments, the probability may be the probability that $\hat{Y}0$ of the selected hard symbol 215 is correct when compared to input symbol 212 y0. In some embodiments, the probability may further be the probability that $\hat{Y}1$ of the selected hard symbol 215 is correct when compared to input symbol y1 212.

In 340, a probability and a value is calculated that is associated with previous hard symbols. In some embodiments, the probability may be the probability that $\hat{Y}0$ of the hard symbol 215 of two symbols ago is correct. In some embodiments, the probability may further be the probability that $\hat{Y}1$ of the hard symbol 215 of one symbol ago is correct. In some embodiments, the value of $\hat{Y}0$ and $\hat{Y}1$ of previous symbols are also determined.

In 350, an enhanced symbol is determined as a function of a comparison between the probability associated with the present hard symbol and the previous hard symbol. In some embodiment, the $\hat{Y}_{enhanced}$ bit of enhanced symbol 275 is selected from either the current hard symbol 215 or, as a result of the probability associated with a previously received hard symbol 215 that the)$\hat{Y}(0)$ bit of the probability of the (n−2) hard symbol 215 is correct.

Figure 8:
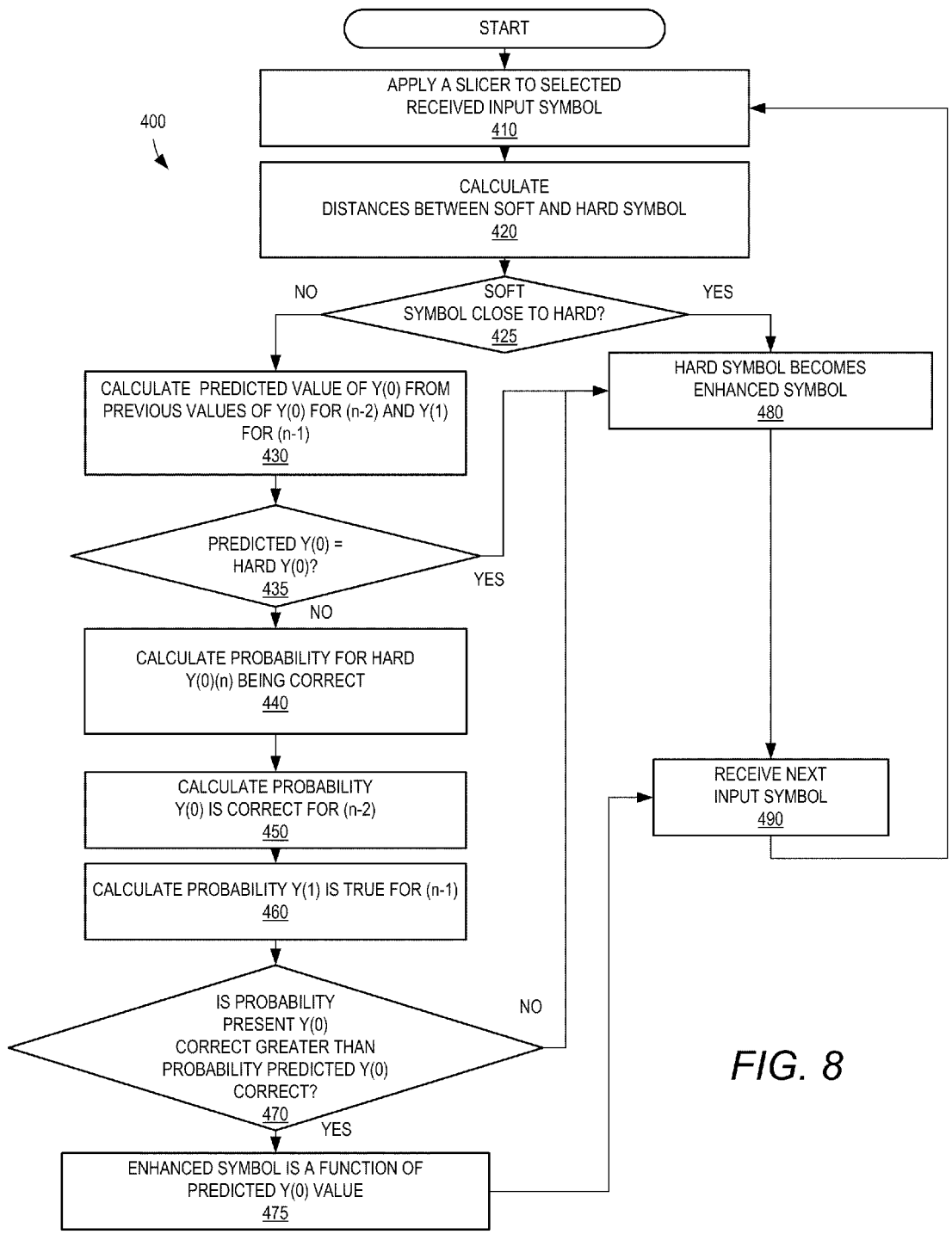
FIG. 8 is a second method for generating an enhanced symbol according to some embodiments.
Figure 9:
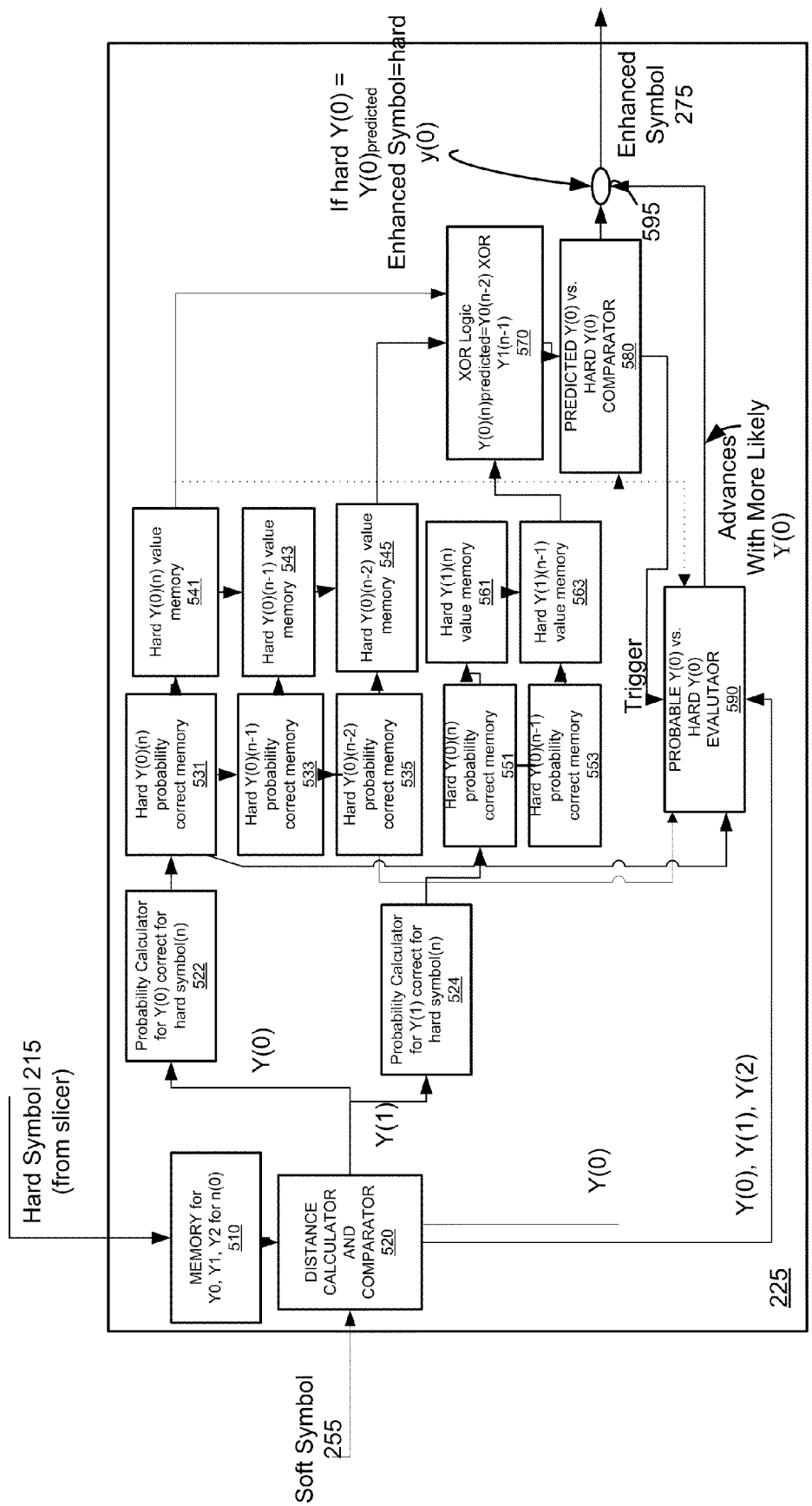
FIG. 9 is a probabilistic evaluator according to some embodiments.

Turning now to FIG. 8, illustrated is a method 800 for generating enhanced symbol 275. For ease of description, FIG. 8 will be described in reference to FIG. 9. FIG. 9 illustrates probabilistic evaluator 215 in more detail, according to some embodiments.

In 410, input symbol 212 is received. Input symbol 212 is then converted to soft symbol 255. Slicer 210 then converts soft symbol 255 to hard symbol 210. Slicer 210 then conveys hard symbol 215 to probabilistic determiner 225. In 225, input symbol 215 may be received at memory 510 of FIG. 9.

In 420, the soft symbol 255 is compared to the hard symbol 215, and the distance between may be calculated in a distance calculator and comparator 520. These values can be the bias λ, $\Delta^2$ etc values that were described above. Distance measurements, etc. concerning $\hat{Y}0$ are conveyed to probability calculator 522 and distance measurements concerning $\hat{Y}1$ are conveyed to probability calculator 524.

In some embodiments, in 425, distance calculator 520 determines if soft symbol 255 and hard symbol 215 are within an acceptable tolerance of one another. If they are, in 480, hard symbol 215 becomes the enhanced symbol 275.

In 490, a next input symbol is received. In some embodiments, this may be input symbol 212. 490 receives the next input symbol 212, and loops back to 410. However, in some embodiments, if they are not close, 425 advances to 430.

Method 400 advances to 430. In 430, predicted value of $\hat{Y}(0)_{predicted}$ for current hard symbol 25 "n" is calculated from the previous values of $\hat{Y}1(n-1)$ and $\hat{Y}2(n-2)$. In some embodiments, this may be an exclusive OR (XOR) combination.

In some embodiments, in 430 a $\hat{Y}(0)n-2$ value is conveyed to XOR logic 570 from memory 545. The $\hat{Y}(1)(n-1)$ value is conveyed to XOR logic 570 from memory 563. Then, within XOR logic 570, $\hat{Y}(1)(n-1)$ and $\hat{Y}(2)(n-2)$ values are XORed together. This XOR of these two values generates a "predicted" $\hat{Y}(0)_{predicted}$ value.

In 430, it is determined whether predicted $\hat{Y}(0)_{predicted}$ value equals the $\hat{Y}(0)$ value received within hard symbol 215. In some embodiments, the $\hat{Y}(0)$ value is conveyed from memory 541 to a comparator 580, and the $\hat{Y}(0)_{predicted}$ value is also conveyed to comparator 580. If the $\hat{Y}(0)$ and $\hat{Y}(0)_{predicted}$ values, are equal, then this agreed-upon $\hat{Y}(0)$ value is conveyed to an appender 595.

In some embodiments of 435, if comparator 580 determines that $\hat{Y}(0)$ of hard symbol 215 does not equal $\hat{Y}(0)_{predicted}$, comparator 580 sends a 'trigger' signal to a $P(\hat{Y}(0)_{predicted}$ versus hard $P(Y(0))$ probability evaluator 590. Evaluator 590 then calculates a probability of correctness for probable $\hat{Y}(0)_{probable}$ in 430, as will be described below.

435 advances to 430 if the $\hat{Y}(0)_{predicted}$ value did not equal $\hat{Y}(0)$ as received in hard symbol 215. In 430, there is calculated a probability for the hard symbol $\hat{Y}(0)$ value being correct. In some embodiments, this calculation occurs in calculator 522. The $\hat{Y}(0)$ value is conveyed to memory 541, and the $P[\hat{Y}(0)]$ is conveyed to memory 531.

In 450, the probability that a previous value of $\hat{Y}(0)$ for two hard symbols 215 ago (n–2) is correct calculated (i.e., $P(\hat{Y}0)$ (n–2) is calculated.) In probabilistic evaluator 225, in some embodiments, probability calculator 522 calculates the probability, based upon such factors was calculated in distance calculator 520, that the hard symbol 215) $\hat{Y}(0)(n-2)$ value is correct. The probability of $P(\hat{Y}(0)(n))$ is correct is stored in 531, and the $\hat{Y}(0)$ hard symbol 215 value itself is stored in 541. In some embodiments, probability values may be calculated with use of the variables illustrated in Table 1, above.

In some embodiments, probability calculations of correctness for $\hat{Y}(0)$ are performed on each hard symbol 215 received by probabilistic evaluator 215. Therefore, the $\hat{Y}(0)$ probability for hard symbol (n) 215 gets conveyed from memory 531 to memory 533, and becomes $\hat{Y}(0)$ probability for (n–1). Similarly, $\hat{Y}(0)$ value for hard symbol 215 n gets conveyed from memory 541 to memory 543, and becomes $\hat{Y}(0)$ value for (n–1). $\hat{Y}(0)$ probability for hard symbol (n–1) gets conveyed from memory 533 to memory 535, and becomes $\hat{Y}(0)$ probability for (n–2). Similarly, $\hat{Y}(0)$ value for hard symbol (n–1) gets conveyed from memory 543 to memory 545, and becomes $\hat{Y}(0)$ value for (n–2).

In 460, the probability that a previous value of $\hat{Y}(1)$ for one hard symbol 215 ago (n–1) is calculated. In probabilistic evaluator 225, in some embodiments, probability calculator 524 calculates the probability, based upon such factors as calculated in distance calculator 520, that the hard symbol 215 $\hat{Y}(1)$ for the (n–1) value is correct. The probability of $\hat{Y}(1)$ for (n) is correct is stored in 551, and the $\hat{Y}(1)$ hard symbol 215 value itself is stored in 561. In some embodiments, probability values for $\hat{Y}(2)$ may be calculated as illustrated in Table 2, above.

In some embodiments, probability calculations for $\hat{Y}(1)$ is performed on each hard symbol 215 received by probabilistic evaluator 215. Therefore, $\hat{Y}(1)$ probability for hard symbol 215 (n) gets conveyed from memory 551 to memory 553, and becomes $\hat{Y}(1)$ probability for (n–1). Similarly, $\hat{Y}(1)$ value for hard symbol 215 (n–1) gets conveyed from memory 561 to memory 563, and becomes $\hat{Y}(1)$ value for hard symbol 215 (n–2). 460 advances to 470.

In 470, it is determined whether the value of $\hat{Y}(0)$ of hard symbol 215 is more likely to be correct, or whether the value of $\hat{Y}(0)_{predicted}$ is more likely to be correct. If hard symbol 215 $\hat{Y}(0)$ has a greater probability of being accurate than the value of $\hat{Y}(0)_{predicted}$, 470 advances to 480. If hard symbol 215 $\hat{Y}(0)$ has a lesser probability of being accurate than the value of predicted $\hat{Y}(0)_{predicted}$, 470 advances to 475.

In 475, predicted $\hat{Y}(0)_{predicted}$ value is used as for the $\hat{Y}(0)_{enhanced}$ value of enhanced symbol 475. In some embodiments, predicted $\hat{Y}(0)_{predicted}$ is conveyed to aggregator 595. Predicted $\hat{Y}(0)_{predicted}$ value is then used as the $Y(0)_{enhanced}$ value in enhanced symbol 275, along with $\hat{Y}(1)$ and $\hat{Y}(2)$ of hard symbol 215.

In 480, in some embodiments, hard symbol $\hat{Y}(0)$ 215 value, received from evaluator 590, is appended to) $\hat{Y}(0)$, $\hat{Y}(1)$ values received from comparator 520 in aggregator 595. Then, hard $\hat{Y}(0)$, $\hat{Y}(1)$, and $\hat{Y}(2)$ are output from aggregator 595 as enhanced symbol 275. 480 advances to 490.

Figure 10:
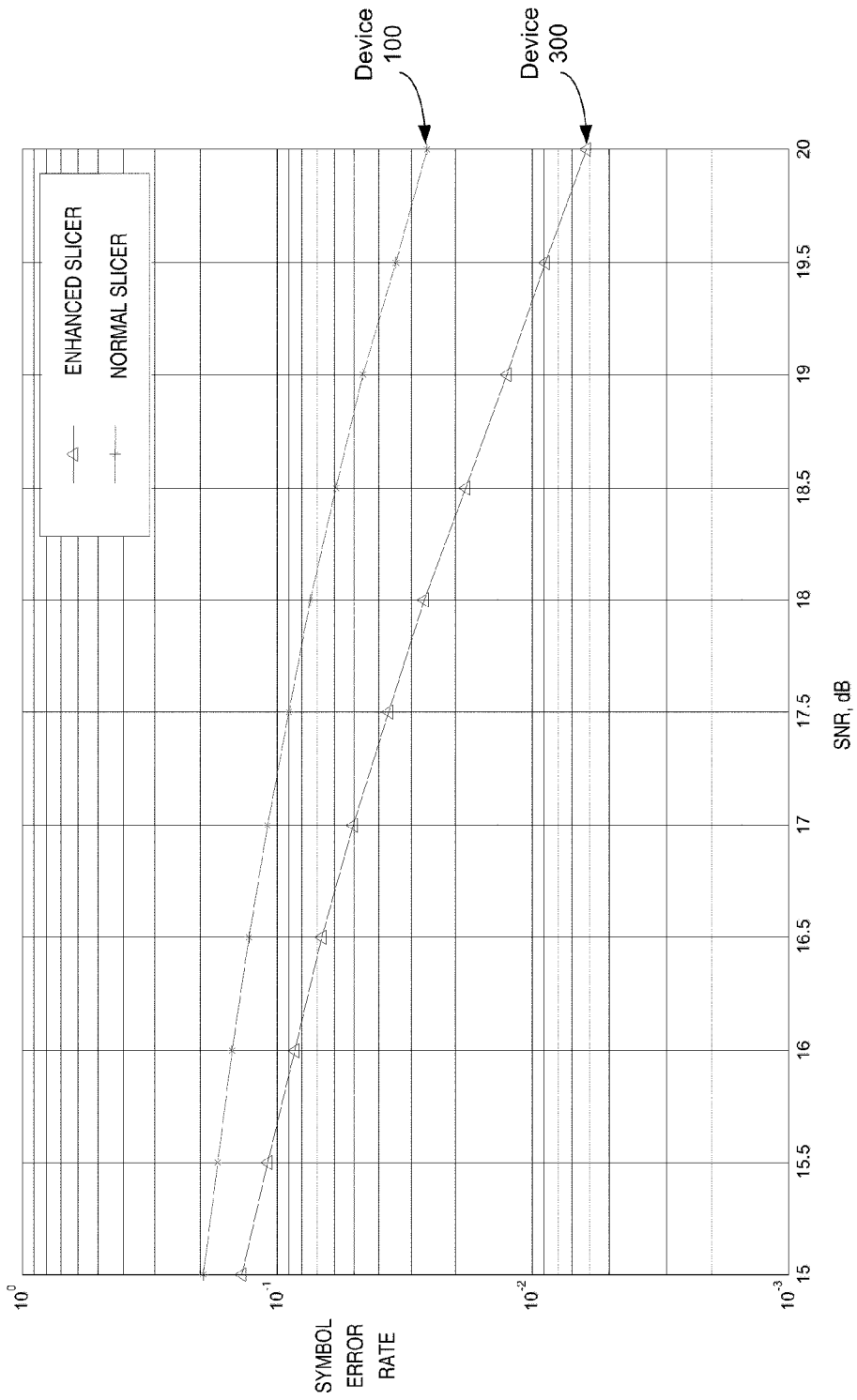
FIG. 10 is a graph of simulated errors comparing a conventional LAF to an LAF of the present disclosure according to some embodiments.

FIG. 10 illustrates a simulated comparison in symbol error rate between device 100 device and the device 300. The improvement is about 2 dB in the range of SNR that may be of interest in the ATSC environment.

Figure 11:
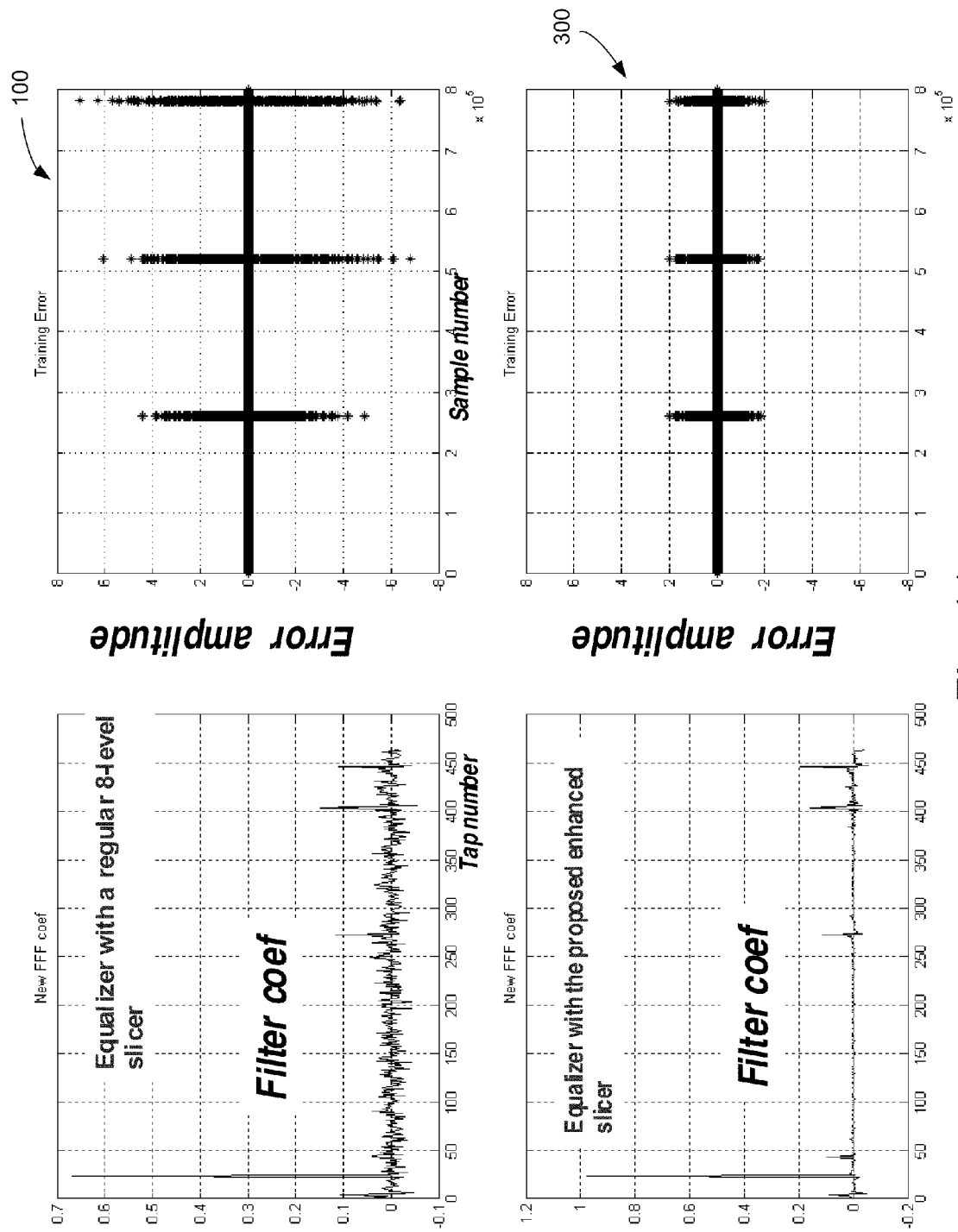
FIG. 11 is a graph of simulated convergence times comparing a conventional LAF to an LAF of the present disclosure according to some embodiments.

FIG. 11 illustrates a simulated comparison in convergence of filter coefficients. A terrestrial environment characterized by multipaths and varying degree of AWGN. For the same stimulus, the simulation is run for a device 100 and an device 300. As a measure of the convergence of each equalizer, the training error (defined as the error during the known preamble) is plotted in time. A converged equalizer should show a stable value of this error in time.

The training error is simulated for 3 consecutive field syncs for both device 100 and device 300. Device 100 starts diverging quickly, (e.g., the time to correct for error is increasing) and its coefficients do not converge. Device 300r shows a stable training error across the same 3 field syncs, and its filter coefficients converge to a stable value.

The several embodiments described herein are solely for the purpose of illustration. Persons skilled in the art will recognize from this description that other embodiments may be practiced with modifications and alterations limited only by the claims.

What is claimed is:
1. A method, comprising:
   outputting, by a slicer, a hard symbol directly to a parity bit probabilistic determinor;
   receiving a soft symbol at the parity bit probabilistic determinor along with the hard symbol; and
   determining, by the parity bit probabilistic determinor, an enhanced symbol as a function of a comparison between a probability associated with the hard symbol and a probability associated with a previous hard symbol; and
   outputting the enhanced symbol from the parity bit probabilistic determinor.

2. The method of claim 1, wherein,
the hard symbol comprises at least three bits, and
the probability associated with the hard symbol is evaluated as a function of a parity bit of the hard symbol.

3. The method of claim 1, further comprising:
calculating a probability associated with the parity bit of the previous hard symbol.

4. The method of claim 1, further comprising:
calculating a distance between the soft symbol and the hard symbol; and
calculating the probability associated with the hard symbol as a function of the distance.

5. An apparatus, comprising:
a slicer to output a hard symbol; and
a parity bit probabilistic determinor coupled directly to the slicer for:
receiving a soft symbol and the hard symbol; and
determining an enhanced symbol as a function of a comparison between a probability associated with the hard symbol and a probability associated with a previous hard symbol.

6. The apparatus of claim 5, further comprising:
a distance calculator for calculating a distance between a hard symbol and a soft symbol; and
a memory for storing a non-parity bit of a previous hard symbol.

7. The apparatus of claim 5, wherein the parity bit probabilistic determinor is to further determine a probability that a parity bit of a previous hard symbol is accurate.

\* \* \* \* \*